Figure 1:
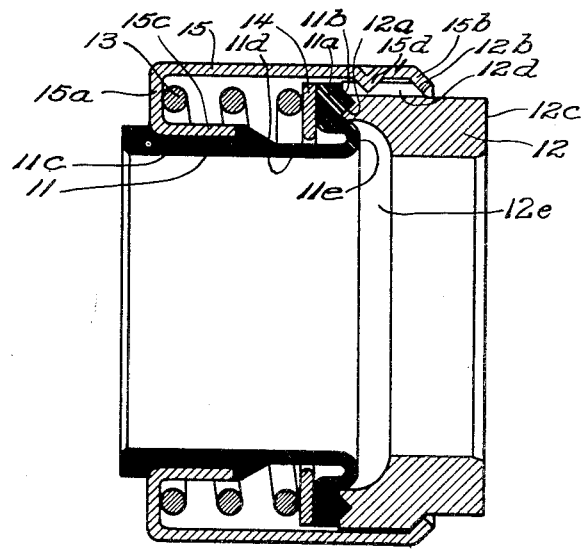

May 2, 1950     H. F. GREINER     2,506,447
SEALING DEVICE
Filed April 4, 1947

INVENTOR
HAROLD F. GREINER
BY
Fraser, Myers & Manley
ATTORNEYS

Patented May 2, 1950

2,506,447

UNITED STATES PATENT OFFICE 2,506,447

SEALING DEVICE

Harold F. Greiner, Geneva, N. Y., assignor to The Garlock Packing Company, Palmyra, N. Y., a corporation of New York Application April 4, 1947, Serial No. 739,326

5 Claims. (Cl. 286—11)

This invention relates to improvements in sealing devices for effecting a seal against the passage of fluid or of dust, dirt or other foreign matter between relatively movable machine elements as, for example, between a rotating shaft and a machine casing within which the shaft is mounted. More particularly, the invention relates to such sealing devices in which the sealing effect between such relatively moving parts occurs at radially extending surfaces of said parts or of elements associated therewith.

Where the sealing effect is at radially extending surfaces it has been found that the sealing elements may quite conveniently be urged axially together into sealing engagement, usually by the use of one or more springs. The springs ordinarily hold the sealing elements together so that the sealing effect is maintained despite wear which may occur upon one or both sealing surfaces. Also, the spring or springs may be sufficiently stressed to render the seal effective where material fluid pressure is present in the machine structure as would be the case where the sealing device is employed in sealing the shaft of a pump.

Most sealing devices of this type heretofore developed have been quite complicated and in most cases were of a character which required the parts thereof to be assembled on the job. Thus there was not only the nuisance of assembly on the job, but also the possibility that an inexpert worker might assemble the parts incorrectly and thus defeat the purpose of the device.

An important object of the present invention is the provision of a unitary radial sealing device which may be completely assembled in the manufacture thereof.

Another important object is the provision of such a sealing device which is very simple and has relatively few parts, and in which the parts are easily assembled in the process of manufacture so that the device may be very economically produced.

Another important object is the provision of such a sealing device with a resilient element that may flex to a substantial extent without however setting up any substantial deformation stresses therein. Thus, although there may be substantial flexing of the resilient element, nevertheless the internal stresses set up therein are so slight that the flexing of the element does not tend to cause it to break down in service.

Another important object is the provision of such a sealing device which is relatively small in radial sectional diameter so that it may be disposed in a relatively small annular space provided therefor in a machine assembly.

Another important object is the provision of such a sealing device in which certain flexible portions are arranged with opposed surfaces subjected to substantially balanced pressures to prevent collapse of such parts under substantial pressure conditions.

Another important object is the provision of such a sealing device in which a distensible flexible web is backed up by a portion of a substantially non-flexible element to prevent excessive distension of the web.

Figure 2:
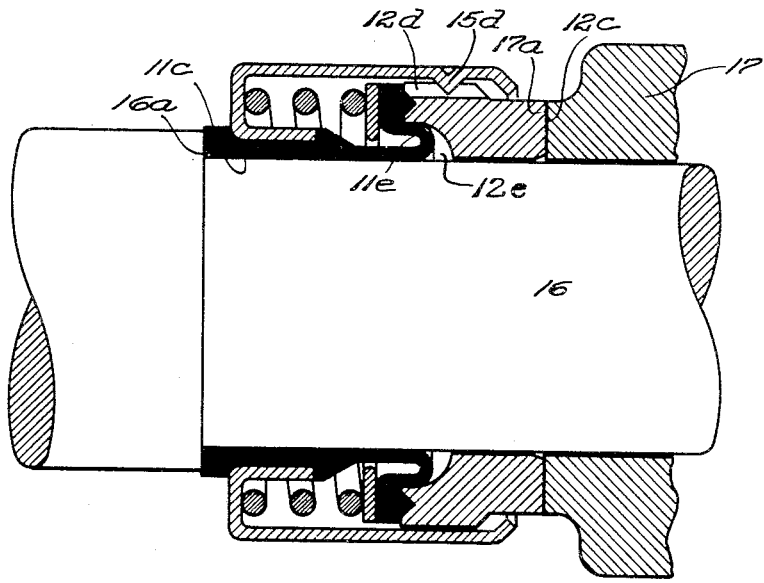

The foregoing and other objects are accomplished by the present invention which, for illustrative purposes only, is shown in a single embodiment in the accompanying drawings in which:

Figure 1 is a central axial sectional view of a sealing device according to the present invention, and Fig. 2 is an axial sectional view of said device in association with a machine casing and a shaft extending through said casing, the shaft being shown in elevation in order to clarify the drawings.

As illustrated, the present device may comprise a sleeve-like diaphragm 11, preferably formed of relatively soft flexible rubber or synthetic rubber or other flexible rubber-like material (hereinafter referred to for convenience merely as "rubber"), a sealing ring 12 which may be of suitable material as, for example, a graphite-impregnated self-lubricating metal, a helical spring 13 and a washer 14, all held in assembled relationship within a shell 15 which preferably is formed of suitable metal.

The assembled device is shown in Fig. 1 unassociated with any machine elements. From this figure, it may be seen that the spring 13 is under compression between the inner left end 15a of the shell 15 and a radial flange 11a of the diaphragm 11, the washer 14 being interposed between the adjacent end of the spring 13 and the flange 11a in order to provide a suitable seat for said spring. The radial flange 11a preferably is thickened somewhat and provided with an angularly annular bead 11b which fits within a complementally shaped annular recess 12a of the sealing ring 12.

Under the described arrangement the compression of the spring 13, acting through the washer 14 and the radial flange 11a of the diaphragm 11, urges the sealing ring 12 toward the right to its extreme position, as shown in Fig. 1, to which position it is limited by an in-turned annular flange 15b formed on the right end of the shell 15 to engage an annular shoulder 12b of the sealing ring 12.

The diaphragm 11 preferably has integral thick and thin sleeve portions 11c, and 11d respectively, at opposite ends thereof and ordinarily the initial inner diameter of these sleeve portions would be slightly less than the diameter of a shaft 16 for which the device is designed to be used. Thus, when the device is slid forcibly onto the shaft, the diaphragm grips the latter firmly and thereby is restrained against either rotational or axial movement relatively thereto and also effects a fixed seal therewith. This gripping effect is enhanced by reason of the fact that the left end of the shell 15 is turned in and back upon itself to form an internal axial flange 15c which is firmly embedded in the thickened sleeve portion 11c of the diaphragm.

The described arrangement is such that when the device is forcibly slid onto the shaft the diaphragm portion 11c is squeezed between the shaft and the shell flange 15c so that both the diaphragm 11 and the shell 15 in normal use are prevented from sliding along the shaft and are both constrained to rotate therewith.

In many installations, reliance would not be placed entirely upon the frictional engagement of the diaphragm 11 and the shaft to prevent movement of the device along the latter, for, as shown in Fig. 2, the thickened portion 11c of the diaphragm may be positioned against a shoulder 16a formed upon the shaft or a collar, snap ring, impeller hub or the like, thereby positively restricting the device against leftward movement relatively thereto.

In the assembly of the device in a machine, the shaft 16, after the present sealing device is positioned thereon, is moved rightwardly relatively to a housing 17 to bring a radial outer face 12c of the sealing ring 12 into sealing engagement with an opposed radial sealing face 17a of the housing 17. After initial contact of the sealing surfaces, the shaft is moved somewhat more toward the right relatively to the housing 17, thereby pressing the sealing ring 12 further into the shell 15 to move the shouldered portion 12b entirely clear of engagement with the annular flange 15b of the shell. In this condition, the connecting portion 11e extends into a concave counterbore 12e in the sealing ring 12 with a relatively small clearance with respect to the surface of said counterbore; also the force of the spring 13 becomes operative to somewhat yieldingly urge the sealing surface 12c into running seal engagement with the surface 17a and to maintain such engagement despite possible limited endwise movement of the shaft relatively to the housing.

Although the parts of the present sealing device are substantially constrained to rotate together because of their frictional inter-engagement, nevertheless means for positively assuring such rotation, particularly with respect to the sealing ring 12, preferably are provided in the form of an axially extending groove 12d formed in the outer face of the shouldered portion 12b of the sealing ring and a dimple or detent 15d in the shell 15 which detent extends into the groove 12c to prevent material relative rotation between the shell and the sealing ring while nevertheless permitting relative axial movement of the two.

It may be observed by comparing Figs. 1 and 2 that when the sealing ring 12 is pressed further into the shell 15 as when the device is assembled in a machine, the sleeve portions 11c and 11d of the diaphragm for the most part are unaffected, while the radial flange 11a of the diaphragm is pushed axially leftwardly relatively to the shell. During the latter movement a channel shaped connecting portion 11e of the diaphragm pursues a slight rolling movement which slightly shortens the sleeve portion 11d and slightly lengthens axially the connecting portion 11e adjacent to its juncture with the radial flange 11a.

In this rolling movement the diaphragm 11 rolls away from the shaft 16 to some extent and to some extent back upon itself. The internal diameter of the radial flange 11a is sufficiently greater than the outer diameter of the sleeve portion 11d that these parts clear each other so that such rolling movement will be substantially unrestrained.

The diaphragm 11 may advantageously be molded to its shape as shown in Fig. 2 so that, in operation, the connecting portion 11e normally is not under any substantial internal stress and any back and forth rolling of said portion, caused by end-play of the shaft, would be relatively slight and would involve only slight and harmless internal stressing of the portion 11e. Even if the diaphragm were molded in its shape as shown in Fig. 1, the rolling movement in operation would not be sufficient to cause rupture of the diaphragm. The capacity of the diaphragm to resist rupture from repeated rolling movements lies in a great measure in the fact that even a substantial rolling movement accompanying substantial axial movement of the sealing ring 12 within the shell causes only negligible cross sectional deformation of the web constituting the connecting portion 11e of the diaphragm and only minor internal stresses therein which are so slight as not to cause rupture of the diaphragm even under substantially continuous back and forth rolling of the diaphragm during long periods of machine operation.

Optionally, the axial flange 15c of the shell may be bonded to the thickened sleeve portion 11c of the diaphragm. The diaphragm 11, also, may be bonded to the sealing ring 12, if desired.

As thus far described, it will be understood that this device will function effectively under low pressure conditions, but it is also effective at relatively high pressures. In structures wherein high pressure is present, the high pressure area is the area within the connecting portion 11e and partially defined by the inner and outer peripheries of the flange 11a. Thus the effect of high pressure on said peripheries is substantially balanced, thereby avoiding any radial collapsing or deformation of the flange 11a either inwardly or outwardly. Although the tongue and groove arrangement 11b, 12a, aided by the spring 13, would effectively prevent such deformation under low pressure conditions, it alone, would be unreliable for that purpose under high pressure conditions. In this device the radially directed force of the high pressure on the flange 11a is substantially in balance and the high pressure is also effective, in addition to the spring 13, to press the flange 11a rightwardly, as viewed in the drawings, thereby rendering the mentioned tongue and groove more effective for preventing such collapsing of the said flange. Any tendency of the connecting portion 11e to be distended by high pressure therewithin is positively limited by the fact that the portion 11e is disposed within the concave counterbore 12e of the sealing ring 12. This counterbore, of course, is large enough to permit the portion 11e to roll within said counterbore during the above-described use of the device, and yet, the surface of said counterbore is sufficiently close to the portion 11e that it positively limits the distension of that portion so that it will not be damaged by the pressure.

From the foregoing it should be obvious that a sealing device according to the present invention is very durable and may be a unitary structure consisting of very few parts. The device is easily assembled in being manufactured and it is easily incorporated into a machine without involving the possibility of parts being improperly assembled by an unskilled workman. Also, the parts are so designed that the device may be disposed within a space of relatively small radial dimensions as is provided in some machines.

Although only one embodiment of the invention is disclosed in the drawings and described in the present specification, it should be apparent, nevertheless, that the present inventive concept could be employed in various other ways without, however, departing from the spirit of the invention as defined in the accompanying claims.

What I claim is:

1. The combination in a sealing device comprising a sleeve-like rubber diaphragm having a marginal ring at one end and a U-shaped annular web flexibly supporting said marginal ring with the convex surface of the U facing in the same direction as said one end, a sealing ring in sealing engagement with one side of said marginal ring and having an annular concave portion in axially opposed relationship to said convex surface for receiving and supporting said web against excessive distension, and an outer shell of strong rigid material having a cylindrical outer portion surrounding both a portion of the diaphragm and a portion of the sealing ring, a web extending radially inwardly from one end of said shell's outer cylindrical portion, an inner cylindrical flange extending axially within said outer cylindrical portion from the inner margin of said web and being in substantially non-slipping engagement with said sleeve, and an inturned annular flange on the other end of the shell's outer cylindrical portion extending into axial alignment with a portion of said sealing ring whereby to limit the latter's axial movement away from said diaphragm.

2. A sealing device for effecting a seal between relatively rotatable outer and inner machine elements comprising a rubber diaphragm having a cylindrical mounting portion adapted to fit tightly upon a cylindrical outer surface of said inner element, a radially outwardly extending annular U-shaped flexible web one extremity of which is integral with the inner end of said mounting portion, and an annular sealing portion directly integral with said web at the latter's other extremity and of larger inner diameter than the outer diameter of said inner end of the mounting portion and capable of axial telescoping movement relatively to said mounting portion, a sealing ring having an annular inner side surface in sealing engagement with an opposed annular outer side surface of said annular sealing portion, a shell of relatively strong rigid material having a cylindrical portion surrounding both the diaphragm and the sealing ring but leaving a portion of the latter with an outer radial sealing surface thereon protruding beyond the adjacent end of the shell, the latter partially defining an annular space between the mounting portion of the diaphragm and the said cylindrical portion of the shell, the latter having a first inturned portion at one end in fixed engagement with the diaphragm's mounting portion and a second inturned portion at its other end coacting with said sealing ring to limit the latter's movement axially outwardly of the shell, and resilient means disposed within said annular space and coacting with the shell's said first inturned portion and with said annular sealing portion of the diaphragm for yieldably urging the latter and the sealing ring toward engagement of the latter with said second inturned portion of the shell.

3. A sealing device according to claim 2, the said first inturned portion of the shell comprising a radial web defining one end of said annular space and the said resilient means comprising a coil spring encircling said mounting portion disposed within said space and compressed between said web and the said peripheral ring.

4. A sealing device according to claim 2, the said U-shaped web being directly connected with the annular sealing portion and with the adjacent inner end of the mounting portion of the diaphragm, the said U-shaped web being of substantially the same thickness as said inner end of the mounting portion and constituting an arcuate continuation thereof, the said U-shaped web and said inner end of the mounting portion being rollable about an annular axis line within the U in the presence of axial movement of the annular sealing portion.

5. A sealing device according to claim 2, the convex surface of the annular U-shaped web facing the sealing ring and the latter having an opposed concave portion for receiving said web therewithin and supporting said web against excessive distension.

HAROLD F. GREINER.

REFERENCES CITED

The following references are of record in the file of this patent:

UNITED STATES PATENTS

| Number | Name | Date |
| --- | --- | --- |
| Re. 22,666 | Snyder | Aug. 14, 1945 |
| 1,931,724 | Fageol et al. | Oct. 24, 1933 |
| 2,027,505 | Winkler | Jan. 14, 1936 |
| 2,186,786 | Jensen | Jan. 9, 1940 |
| 2,201,478 | Czarnecki et al. | May 21, 1940 |
| 2,395,953 | Bertea | Mar. 5, 1946 |
| 2,399,764 | Schilling | May 7, 1946 |
| 2,426,047 | Payne | Aug. 19, 1947 |

FOREIGN PATENTS

| Number | Country | Date |
| --- | --- | --- |
| 574,619 | Great Britain | of 1946 |

Certificate of Correction

Patent No. 2,506,447                                                       May 2, 1950

HAROLD F. GREINER

It is hereby certified that errors appear in the printed specification of the above numbered patent requiring correction as follows:

Column 2, lines 47 and 48, for the word "angularly" read *angular*; column 5, line 61, after "with" insert *and a continuation of*;

and that the said Letters Patent should be read with these corrections therein that the same may conform to the record of the case in the Patent Office.

Signed and sealed this 22nd day of August, A. D. 1950.

[SEAL]

THOMAS F. MURPHY,
*Assistant Commissioner of Patents.*